US009045070B2

(12) United States Patent
Pauluk et al.

(10) Patent No.: US 9,045,070 B2
(45) Date of Patent: Jun. 2, 2015

(54) INSERT INJECTION MOLD D-RING FOR TIE DOWN APPLICATION

(71) Applicant: Magna International Inc., Aurora (CA)

(72) Inventors: Daniel John Pauluk, Macomb Township, MI (US); Erik Richard Davis, Commerce Township, MI (US); Brian Blackwood Bradley, Rochester Hills, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 14/200,931

(22) Filed: Mar. 7, 2014

(65) Prior Publication Data

US 2014/0255121 A1 Sep. 11, 2014

Related U.S. Application Data

(60) Provisional application No. 61/774,183, filed on Mar. 7, 2013.

(51) Int. Cl.
*B60P 7/08* (2006.01)
*B29C 45/16* (2006.01)

(52) U.S. Cl.
CPC ............... *B60P 7/0807* (2013.01); *B29C 45/16* (2013.01)

(58) Field of Classification Search
CPC ...... B60P 3/079; B60P 7/0807; B60P 7/0815; B60P 7/08; B61D 45/001; B29C 45/16
USPC ......... 410/101, 102, 106, 107, 110, 111, 116; 24/265 CD, 115 K; 248/499
See application file for complete search history.

(56) References Cited

U.S. PATENT DOCUMENTS 6,065,917 A * 5/2000 Shambeau et al. ............ 410/107
6,138,975 A * 10/2000 McDaid

* cited by examiner

*Primary Examiner* — Stephen Gordon
(74) *Attorney, Agent, or Firm* — Warn Partner, P.C.

(57) ABSTRACT

A tie down device for tie down application including a D-ring with overmold used for a motor vehicle to secure cargo of various shapes and sizes using removable straps. The tie down device includes a D-ring, an overmold plastic portion, bracket portion, and an interior bracket. The tie down device withstands a minimum load requirement suitable to secure a cargo in place. A round steel bar is shaped into the D-ring feature and inserted into the mold for forming the overmold plastic portion. The plastic forms in an overmold around the metal material into the desired shape. The molding process obtains the features and shape required from at least a visual perspective and the round steel bar, which is partially encapsulated by the overmold plastic portion, provides strength to meet the predetermined load requirements. The interior bracket acts as a spring to control the tension of the bracket portion.

15 Claims, 2 Drawing Sheets

FIG. 1
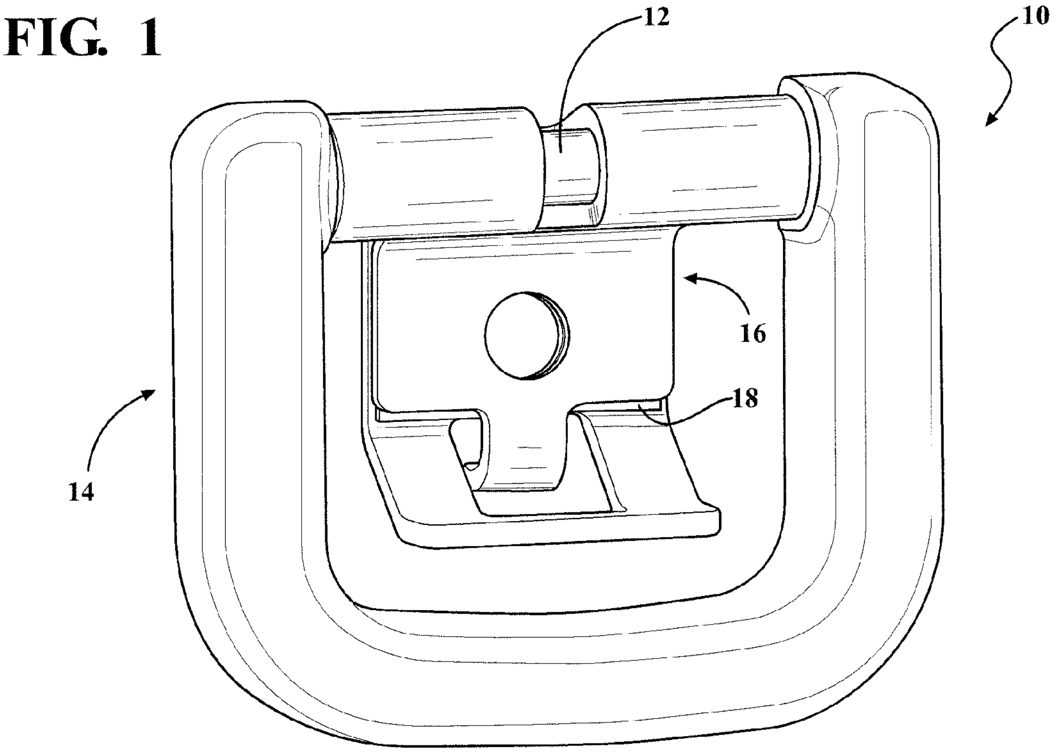
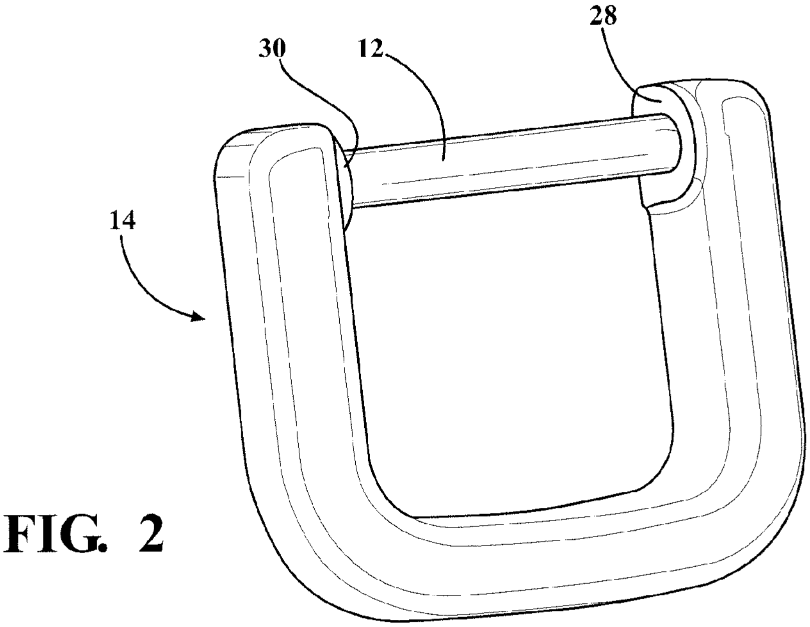
FIG. 2

INSERT INJECTION MOLD D-RING FOR TIE DOWN APPLICATION

CROSS-REFERENCE TO RELATED APPLICATIONS

This application claims the benefit of U.S. Provisional Application No. 61/774,183, filed Mar. 7, 2013. The disclosure of the above application is incorporated herein by reference.

FIELD OF THE INVENTION

The present invention relates to a metal device with plastic overmold for a tie down application for a vehicle and process for making same.

BACKGROUND OF THE INVENTION

Tie down assemblies are generally known and used for a variety of vehicles to allow an operator to selectively secure cargo. Generally, when desirable to have a cargo secured in place using straps, ropes, netting, and other suitable securing wrapping band, the strap is connected to the tie down of the vehicle to hold the cargo. One known application is tie down assemblies associated with the bed of a pickup truck to selectively secure cargo on the bed using straps.

While various tie-down assemblies have been developed, they are difficult to manufacture and expensive. There is a need for rectangular style tie downs suitable for particular applications with styled curved features that can meet minimum load requirements of at least 1000 pounds. In addition, typical tie downs are manufactured in cast processes to form the desired shape or metal round bar formed into the feature. Further, oversized steel blanks are used for forming the desired feature/shape suitable and machined down to size. This process is labor intensive, expensive, increases waste, and increases the piece price of the tie down assembly.

Accordingly, there exists a need for an insert injection mold D-ring tie down assembly for a vehicle configured to improve ease of use and effectiveness and process for making same more easily and cost effectively.

SUMMARY OF THE INVENTION

The present invention is directed to an insert injection mold D-ring assembly for tie down applications, hereafter also referred to interchangeably as “tie down device”, generally comprising a D-ring with overmold used for a motor vehicle to allow an operator to selectively secure cargo of various shapes and sizes using removable straps. The tie down device of the present invention includes a D-ring, a bracket portion, and a partially encapsulating plastic portion, hereafter also referred to interchangeably as “overmold plastic portion”, “plastic portion”, and “overmold portion”. The tie down device is operable to meet a predetermined minimum pound load requirement suitable for helping to secure a cargo in place using straps and the like. A round metal bar is shaped into the D-ring feature and inserted into the mold to form the plastic portion having a predetermined shape and configuration. The molding process obtains the features and shape required from at least a visual perspective and the round steel bar, which is partially encapsulated by the plastic portion, helps to provide strength to meet the predetermined force requirements. An interior bracket located between opposing segments of the bracket portion acts as a spring to help control the tension of the bracket portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a tie down device, in accordance with the present invention;

FIG. 2 is a perspective view of a D-ring of the tie down device with an overmold plastic portion, in accordance with the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 3:
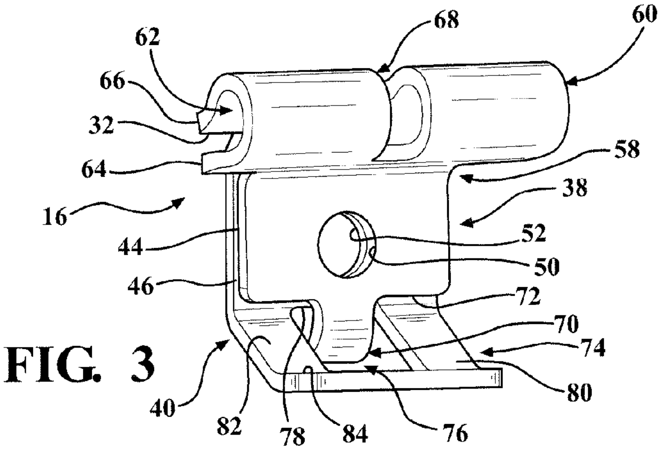
FIG. 3 is a perspective view of a bracket portion of the tie down device, in accordance with the present invention.
Figure 4:
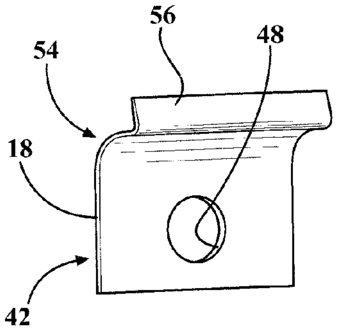
FIG. 4 is a perspective view of an interior bracket of the tie down device, in accordance with the present invention.
Figure 5:
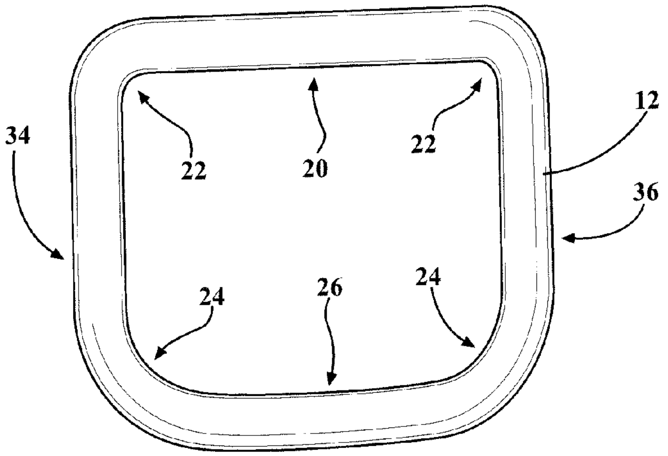
FIG. 5 is a perspective view of the D-ring of the tie down device, in accordance with the present invention.
Figure 6:
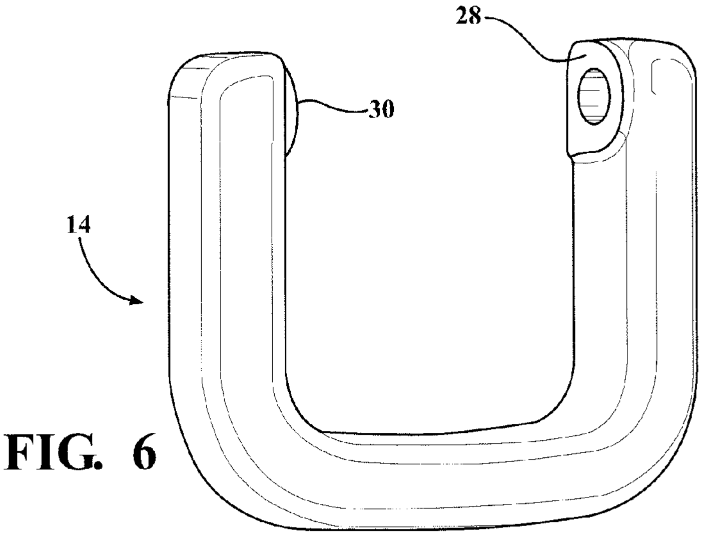
FIG. 6 is a perspective view of the overmold plastic portion without the D-ring for clarity, in accordance with the present invention.

Referring to FIGS. 1-6 generally, a tie down device of the present invention is generally shown at 10. The tie down device 10 includes a D-ring 12, an encapsulating plastic portion, generally shown at 14, and a bracket portion, generally shown at 16. The bracket portion 16 further comprises an interior bracket 18 suitable for additional strength and stability of the interior bracket 16. The interior bracket 18 acts as a spring to help control the tension of the bracket portion 16. The tie down device 10 is operable to meet a predetermined minimum pound load requirement suitable for helping to secure a cargo in place using straps and the like. Most preferably, the tie down device 10 meets at least a 1000 pound load requirement.

Generally, a round metal bar having a circular cross section and a thickness suitable for withstanding a predetermined load requirement, is first formed into a rectangular style shape. Most preferably, the metal round bar is steel and is formed into a D-ring shape providing the D-ring 12 that will partially be encapsulated. The metal D-ring 12 provides strength to meet predetermined load requirements. Preferably, the ends of the metal round bar are connected together for added strength of the D-ring 12. The D-ring 12 is then inserted into a mold to form the plastic portion 14 partially encapsulating the D-ring 12.

The D-ring 12 includes a straight segment, generally shown at 20, that will not be overmolded, first corner portions, generally shown at 22, and second corner portions 24, that are curved, a first intermediate portion, shown generally at 34, a second intermediate portion, shown generally at 36, and a bottom portion, generally shown at 26, all of which are overmolded except for the straight segment 20. The first and second intermediate portions 34,36, extend between the respective first corner portions, 22, and second corner portions, 24. The bottom portion 26 extends between the two second corner portions 24. Most preferably, the first corner portions 24 have a greater radius or a more gradual arc in relation to the first corner portions 22 for forming the D-shape in combination with the straight segment 20, first and second intermediate portions 34,36, and bottom portion 26. The straight segment 20 of the D-ring extends between first and second projections 28,30, e.g., raised boss, collar, protuberant, of the encapsulated plastic portion 14 that are formed during overmolding of the D-ring 12 and extend toward one another.

The insert molding process obtains the features and shape required of the encapsulating plastic portion 14 from at least a visual perspective and the round steel bar, which is partially encapsulated or overmolded by the plastic portion, helps to provide strength to meet the predetermined force requirements. Generally, the encapsulating plastic portion 14 has a substantially square cross section. Alternative shapes suitable from a visual and/or strength perspective are contemplated.

The interior bracket 18 is sandwiched between a first and second segment of the bracket portion 16, shown generally at 38,40, that are opposed to one another. A substantially planar portion, shown generally at 42, of the interior bracket 18 is located between a first and second wall, shown generally at 44,46, of the bracket portion 16 that are substantially parallel and planar. An aperture 48 is formed in the planar portion 42 of the interior bracket 18 and aligns with a pair of apertures 50,52 each one formed through the first and second walls 44,46 respectively, for receiving a fastener. The fastener is a fastening device for mounting the tie down device 10 to a side rail of a vehicle bed or otherwise coupling the tie down device 10 to a desired area and component of the vehicle and/or for a cargo securing device, e.g., a strap, for securing cargo in place. The interior bracket 18 is also metal, most preferably, steel.

The interior bracket 18 further includes at least one curved portion, shown generally at 54, and an upward extending lip 56, which are integrally formed with the planar portion 42 as one piece. The at least one curved portion 54 extends the length of the planar portion 42 and the lip 56. The radius of the curved portion 54 is suitable to generally align with and follow the radius of a contoured at least one intermediate portion, shown generally at 58, of the bracket portion 16, the curved portion 54 being located between the first and second opposing segments 38,40 of the bracket portion 16.

The bracket portion 16 further has at least one attachment member, shown generally at 60, extending from the curved at least one intermediate portion 58 to engage the D-ring 12. The at least one attachment member 60, at least one intermediate portion 58, and first and/or second opposing segments 38,40 of the bracket portion 16 are integrally formed as one piece. The lip 56 of the interior bracket 18 extends from the curved portion 54 upward in the direction generally toward this at least one attachment member 60, and the lip 56 of the interior bracket 18 is located at least partially within the area of the at least one attachment member 60. Most Preferably, the lip 56 is located within the at least one attachment member 60. The interior bracket 18 has an additional bend or curvature where the at least one curved portion meets the lip 56 to enhance the attachment of the interior bracket 18 at the at least one attachment member 16. The interior bracket 18 acts as a spring to help control the tension of the bracket portion 16.

Generally, the at least one attachment member 60 of the bracket portion 16 is elongated, open at both ends, and has an elongated opening 32 that is formed entirely along the longitudinal edge of the attachment member 60 for receiving the D-ring 12 within a recess, shown generally at 62, of the at least one attachment member 60. Typically, the at least one attachment member 60 is shaped like an open curve with a rounded central portion and substantially identical, enantiomorphic legs, shown generally at 64,66. Preferably, the at least one attachment member 60 is suitably shaped and the elongated opening 32 is suitably sized to help prevent undesirable lateral movement of the straight segment 20 of the D-ring, including, moving laterally out of the recess 62.

The elongated opening 32 is narrower than the recess 62. The straight segment 20 of the D-ring 12 is pushed laterally through the narrower opening 32 and/or the at least one attachment member 60 is forced over the straight segment 20 of the D-ring 12 until the straight segment 20 is contained in the recess 62. When the D-ring is connected to the at least one attachment member 60, the ends of the at least one attachment member 60 directly abuts against the first and second projections 28,30 of the overmold plastic portion 14, and the opening 32 of the at least one attachment member 60 is operably configured and sized to help prevent the D-ring from moving laterally out of the opening 32. The abutting engagement of the at least one attachment member 60 with the first and second projections 28,30 is operable to prevent or eliminate slop or longitudinal movement of the at least one attachment member 60 along the straight segment 20 of the D-ring 12 and provide improved strength and stability.

A gap 68 is either formed in the at least one attachment member 60 or is located between at least two attachment members 60 that are adjacent to one another. Most preferably, the gap 68 is formed in one of the at least one attachment members 60 toward the middle of the at least one attachment member 60 for processing access and assembling of the tie down device 10. The gap 68 also reduces material amount and cost, weight, and assists with maintenance and repairs. The bracket portion 16 is also metal, most preferably, steel.

The first segment 38 of the bracket portion 16 has a hook, generally shown at 70, that is downwardly projecting from the bottom 72 of the first wall 44. The second segment 40 of the bracket portion 16 has a lower portion, shown generally at 74, that is sloped generally in a direction opposite to the direction of the distal end of the hook 70, and has an open area, shown generally at 76, that the hook 70 of the first segment 38 at least partly extends through. The open area 76 is defined by the bottom 78 of the second wall 40 and/or interior bracket 18 bottom, a first and second angled member 80,82, and a cross-member 84 connected to the first and second angled member 80,82. An area of attachment for a cargo strap or other suitable attachment device for tying down cargo is provided by the attachment features selected from the group consisting of the hook 70, the lower portion 72, the overmold plastic/D-ring portion 14/12, and combinations thereof.

A predetermined amount of flex is considered suitable to withstand the vibration of cargo loads while the vehicle is moving. It is within the contemplation of the present invention that the bracket 16 can be movable. By way of example, in an alternative embodiment, the bracket 16 can be selectively rotatable a predetermined amount about the D-ring 12 and/or the overmold plastic portion/D-ring selectively rotatable a predetermined amount with respect to the bracket 16.

Preferably, the bracket 16, interior bracket 18 and D-ring 12 are made of metal(s) suitable for meeting strength requirements. Most preferably, steel. The encapsulating plastic portion 14 is thermoplastic or other suitable material for overmolding the D-ring 12 and forming desired features and shapes for the tie down device. It is further contemplated that reinforcing additives can additionally be employed with the thermoplastic suitable for helping to meet structural and/or strength requirements. Composite materials, and glass filled thermoplastics, reinforcing fillers including, but are not limited to, talc, fiberglass, carbon fiber, and other suitable materials are also contemplated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tie down device for a vehicle, comprising:

a D-ring that is metal;

an overmold portion, said D-ring partially encapsulated within said overmold portion;

a bracket portion connected to said D-ring; and an interior bracket that acts as a spring to control tension of said bracket portion;

wherein the D-ring further comprises:

a straight segment that is at least partially not overmolded;

a pair of first corner portions having a curvature, said straight segment extending between said pair of first corner portions;

a pair of second corner portions having a curvature greater than said first corner portions;

a first intermediate portion extending between one of said pair of first corner portions and one of said pair of second corner portions;

a second intermediate portion extending between the other one of said pair of first corner portions and the other one of said pair of second corner portions; and a bottom portion extending between said pair of second corner portions;

wherein said first corner portions, second corner portions, first intermediate portion, second intermediate portion and bottom portion are fully encapsulated within said overmold portion.

2. The tie down device of claim 1, wherein the D-ring is formed from a round steel bar formed into a D-like shape to provide strength and meet predetermined load requirements.

3. The tie down device of claim 1, wherein the D-ring withstands a predetermined load requirement, said load requirement being at least 1000 pounds.

4. The tie down device of claim 1, wherein said overmold portion further comprises a first and second projection extending inwardly, said straight segment extending into said first and second projections.

5. The tie down device of claim 1, wherein said overmold portion has a square or rectangular cross-section, and first and second projections extending inwardly, said D-ring connected to said bracket portion between said first and second projections.

6. The tie down device of claim 1, wherein said overmold portion is made of a composite material.

7. The tie down device of claim 1, wherein said bracket portion further comprises at least one attachment member that is elongated and has two open ends, said at least one attachment member comprising an opening that is formed along a longitudinal edge of the at least one attachment member;

a recess that is curved and sized to receive said D-ring for connecting said bracket portion to said D-ring;

wherein said opening reduces undesirable lateral movement of the D-ring, including, moving laterally out of said recess.

8. The tie down device of claim 7, wherein said at least one attachment member is in abutting engagement with said overmold portion to reduce undesirable longitudinal movement of said at least one attachment member on said D-ring.

9. The tie down device of claim 1, wherein said interior bracket is disposed within said bracket portion, said interior bracket further comprising a planar portion having an aperture;

a lip that is upwardly extending in a plane generally parallel to said planar portion; and at least one curved portion located between said planar portion and said lip;

wherein said planar portion, lip, and at least one curved portion are integrally formed.

10. The tie down device of claim 1, wherein said bracket portion further comprises, at least one attachment member, said at least one attachment member connected directly to said D-ring;

a first segment integrally formed with said at least one attachment member, said first segment having a first wall portion that is planar;

a second segment having a second wall portion that is planar;

at least one intermediate portion having a curvature and disposed between said first wall portion and/or second wall portion and said at least one attachment member;

a hook portion integrally formed with said first segment and extending downward from a bottom of said first wall portion to form an area of attachment for a cargo fastener; and a lower portion integrally formed with said second segment and extending at a downward slope from said second wall portion and forming an open area that said hook portion at least partially extends through.

11. A tie down device for a vehicle, comprising:

a D-ring that is formed from a round steel bar and meets a load requirement of at least 1000 pounds;

a bracket portion that is metal and comprises at least one attachment member, said at least one attachment member connected to said D-ring;

an overmold portion encapsulating said D-ring, wherein said overmold portion does not encapsulate the area of the D-ring where said at least one attachment member is connected;

an interior bracket that is metal and acts as a spring to control tension of the bracket portion, wherein said interior bracket is disposed within said bracket portion, said interior bracket further comprising:

a planar portion having an aperture that aligns with a pair of apertures formed in said bracket portion;

a lip that is upwardly extending in a plane generally parallel to said planar portion; and at least one curved portion located between said planar portion and said lip and corresponding to a curvature of at least one intermediate portion of said bracket portion;

wherein said planar portion, lip, and at least one curved portion are integrally formed.

12. The tie down device of claim 11, wherein the D-ring further comprises a straight segment, said at least one attachment member connected to said straight segment;

a pair of first corner portions having a curvature, said straight segment extending between said pair of first corner portions;

a pair of second corner portions having a curvature greater than said first corner portions;

a first intermediate portion extending between one of said pair of first corner portions and one of said pair of second corner portions;

a second intermediate portion extending between the other one of said pair of first corner portions and the other one of said pair of second corner portions; and a bottom portion extending between said pair of second corner portions;

wherein said first corner portions, second corner portions, first intermediate portion, second intermediate portion and bottom portion are fully encapsulated within said overmold portion.

13. The tie down device of claim 12, wherein said overmold portion further comprises a first and second projection extending inwardly, said straight segment extending through said first and second projections, said D-ring connected to said bracket portion between said first and second projections.

14. The tie down device of claim 11, wherein said at least one attachment member is elongated and has two open ends, said at least one attachment member further comprising an opening that is elongated and located between longitudinal edges of the at least one attachment member; and a recess that is curved and sized to receive said D-ring for connecting said at least one attachment member to said D-ring;

wherein said opening reduces undesirable lateral movement of the D-ring, including, moving laterally out of said recess; and wherein said at least one attachment member is in abutting engagement with said overmold portion to reduce undesirable longitudinal movement of said at least one attachment member on said D-ring.

15. The tie down device of claim 11, wherein said bracket portion further comprises, a first segment integrally formed with said at least one attachment member, said first segment having a first wall portion that is planar;

a second segment having a second wall portion that is planar, said planar portion of said interior bracket located between said first and second wall portions;

said at least one intermediate portion disposed between said first wall and/or second wall portion and said at least one attachment member;

a hook portion integrally formed with said first segment and extending downward from a bottom of said first wall portion to form an area of attachment for a cargo fastener; and a lower portion integrally formed with said second segment and extending at a downward slope from said second wall portion and forming an open area that said hook portion at least partially extends through to form an area of attachment for a cargo fastener.

* * * * *